(12) United States Patent
Palfer-Sollier et al.

(10) Patent No.: US 11,755,485 B2
(45) Date of Patent: Sep. 12, 2023

(54) SNOOP FILTER DEVICE

(71) Applicant: NUMASCALE AS, Oslo (NO)

(72) Inventors: Thibaut Palfer-Sollier, Oslo (NO); Steffen Persvold, Oslo (NO); Helge Simonsen, Oslo (NO); Mario Lodde, Borore (IT); Thomas Moen, Oslo (NO); Kai Arne Midjås, Vinterbro (NO); Einar Rustad, Oslo (NO); Goutam Debnath, Beaverton, OR (US)

(73) Assignee: NUMASCALE AS, Oslo (NO)

( * ) Notice: Subject to any disclaimer, the term of this patent is extended or adjusted under 35 U.S.C. 154(b) by 16 days.

(21) Appl. No.: 17/440,128

(22) PCT Filed: Mar. 13, 2020

(86) PCT No.: PCT/NO2020/050070
§ 371 (c)(1),
(2) Date: Sep. 16, 2021

(87) PCT Pub. No.: WO2020/197404
PCT Pub. Date: Oct. 1, 2020

(65) Prior Publication Data
US 2022/0156195 A1    May 19, 2022

(30) Foreign Application Priority Data
Mar. 22, 2019  (NO) .................................. 20190393

(51) Int. Cl.
*G06F 12/0831* (2016.01)
*G06F 12/0817* (2016.01)
(Continued)

(52) U.S. Cl.
CPC ........ *G06F 12/0833* (2013.01); *G06F 12/082* (2013.01); *G06F 12/084* (2013.01); *G06F 12/0846* (2013.01); *G06F 12/0873* (2013.01)

(58) Field of Classification Search
CPC ............... G06F 12/082; G06F 12/0831; G06F 12/0833; G06F 12/084; G06F 12/0846;
(Continued)

(56) References Cited

U.S. PATENT DOCUMENTS 7,325,102 B1   1/2008  Cypher
2006/0294314 A1  12/2006  Cheng
(Continued)

FOREIGN PATENT DOCUMENTS

GB   2444818   6/2008
GB   2493593   2/2013

OTHER PUBLICATIONS

Norwegian Search Report mailed in No. 20190393 dated Oct. 18, 2019 (2 pages).
(Continued)

*Primary Examiner* — Aracelis Ruiz
(74) *Attorney, Agent, or Firm* — Wissing Miller LLP (57) ABSTRACT

The invention relates to a device for use in maintaining cache coherence in a multiprocessor computing system. The snoop filter device is connectable with a plurality of cache elements, where each cache element comprises a number of cache agents. The snoop filter device comprises a plurality of snoop filter storage locations, where each snoop filter storage location is mapped to one cache element.

12 Claims, 7 Drawing Sheets

(51) Int. Cl.
*G06F 12/084* (2016.01)
*G06F 12/0846* (2016.01)
*G06F 12/0873* (2016.01)

(58) Field of Classification Search
CPC .............. G06F 12/0873; G06F 12/126; G06F 2212/1024; G06F 2212/1044; Y02D 10/00
See application file for complete search history.

(56) References Cited

U.S. PATENT DOCUMENTS

| | | |
|---|---|---|
| 2007/0233966 A1 | 10/2007 | Cheng |
| 2016/0062893 A1* | 3/2016 | Tune .................. G06F 12/0831 711/146 |
| 2016/0117249 A1 | 4/2016 | Lin |
| 2016/0188471 A1* | 6/2016 | Forrest ................ G06F 12/0828 711/119 |
| 2017/0185516 A1* | 6/2017 | Stevens ............... G06F 12/0831 |
| 2018/0004663 A1* | 1/2018 | Jalal ................... G06F 12/0811 |

OTHER PUBLICATIONS

International Search Report and Written Opinion mailed in PCT/NO2020/050070 dated Jun. 8, 2020 (7 pages).

* cited by examiner

SNOOP FILTER DEVICE

CROSS-REFERENCE TO RELATED APPLICATIONS

This application is a 371 of PCT/NO2020/050070 filed on Mar. 13, 2020, published on Oct. 1, 2020 under publication number WO 2020/197404 A1, which claims priority benefits from Norwegian Patent Application No. 20190393 filed Mar. 22, 2019, the disclosures of each are incorporated herein in their entirety by reference.

TECHNICAL FIELD

The disclosure relates to a device for maintaining cache coherence in a multiprocessor computing system.

BACKGROUND

Efficiently maintaining cache coherence is a central requirement for obtaining high performance shared memory multiprocessor systems.

Shared memory multiprocessor systems usually contain one or more shared main memory agents in addition to a series of local memory agents, called cache agents, or just cache. The cache agents may belong only to a local processor or to a node of processors and are characterized by their high speed and small size compared with the main memory. Storing data in a local cache agent that e.g. belongs to a working set of a local CPU will thus largely improve the overall performance of the multiprocessor system as the frequently used data in the working set can be more quickly accessed by the local CPU.

Having a series of local cache agents each holding data locally gives rise to the problem with how to maintain cache coherence. If a CPU modifies a cache line in a local cache agent through e.g. a write-operation, other cache agents holding a copy of the same cache line will be unaware of this write operation, and their copy of the respective cache line will consequently be out of date. These out of date cache lines may then be defined as stale. A cache line is generally considered as a combination of a block of data and an address belonging to this block of data. The address may for example comprise a cache line identifier/tag.

In order to obtain cache coherence, i.e. eliminating stale data, a wide variety of techniques and procedures have been implemented. This involves implementing a variety of cache coherence protocols, like the MSI, MESI, MOESI protocols, as well as implementing a variety of cache coherence mechanisms, like snoopy bus-based methods.

Snoopy bus-based methods usually involve what is called a snooper that snoops transactions that are being communicated across a bus, and updates the local cache accordingly. The snooper may belong to a cache agent, or group of cache agents, and the bus may run between various agents in the computer system, including cache agents, cache elements, cache nodes, CPUs etc. Whenever a transaction that modifies a cache line is being communicated on the bus, the snooper snoops this transaction, checks whether its respective cache agent holds a copy of this cache line, and modifies the cache line according to the transaction communicated across the bus.

One problem with snoopy bus-based cache coherence mechanisms is that every time a transaction occurs on the bus, the snooper has to check its appurtenant cache agents/elements for a copy of the cache line communicated across the bus. This action is commonly called a lookup action and involves a series of procedural steps having to be performed.

The concept of a snoop filter has been developed in order to improve on the efficiency of snoopy based cache coherence mechanisms. A snoop filter is a directory-based structure that maintains information related to a series of cache lines stored in the cache. In a multi-processor system, a snoop filter may for example monitor the bus traffic and filter out the transactions on the bus not relating to a cache line that is stored in any of its appurtenant cache agents. This results in the snooper having to perform fewer power and time-consuming lookups, and hence improves the efficiency of the snoopy based cache coherence mechanism.

A snoop filter is commonly structured in order to maintain information as entries stored in a series of snoop filter storage locations. Each snoop filter storage location is commonly configured to store an entry comprising at least a tag that identifies an appurtenant cache line, and optionally various additional information such as state bits, and a series of presence vectors that indicate which cache agents in the system that holds a copy of the cache line identified by the tag. The fraction of each snoop filter storage location associated with presence bits may often be large, resulting in a large overhead. An entry is often defined as the collective information stored in the snoop filter which relate to one specific tag.

Most snoop filters are sized such that they can store a limited amount of information, e.g. a fixed number of entries. The large number of presence vectors in snoop filter entries thus results in a storage capacity problem, consequently limiting the number of snoop filter entries that the snoop filter can maintain. It is desirable to have a snoop filter that covers, i.e. contains information regarding the presence of, as many cache lines as possible per snoop filter storage.

The limited size of a snoop filter will eventually lead to the snoop filter filling up, making it unable to store additional entries. In order to make room for a new entry, the snoop filter will have to dispose of one of its entries through what is called an eviction process. During an eviction process the snoop filter evicts one of its entries and sends a back-invalidation signal to the cache agents in the system that are indicated as holding a copy of the cache line identified by the snoop filter entry being evicted. This back-invalidation signal causes the cache agents to mark the relevant cache line as invalid in order to avoid future problems related to stale data. A problem with this process is that the invalidated cache lines may be in use when invalidated, leading e.g. to additional reloading operations having to be performed.

It is the goal of the present invention to improve the structure of a snoop filer in order to reduce the negative impact of an eviction as well as to increase the efficiency of the snoop filer.

SUMMARY OF THE INVENTION

The invention provides a snoop filter device connectable with a plurality of cache elements, where each cache element comprises a number of cache agents, the snoop filter device comprising a plurality of snoop filter storage locations, each configured to store a tag that identifies a cache line storable in a cache agent, where each snoop filter storage location is mapped to one cache element.

Each snoop filter storage location is in one embodiment of the invention configured to additionally store an identifier for a cache element. Each snoop filter storage location may be mapped to one cache element identified by the identifier stored at that snoop filter storage location.

Each snoop filter storage location is in another embodiment of the invention implicitly associated with one cache element. Each snoop filter storage location may be mapped to one cache element using hard wiring.

Each snoop filter storage location is according to yet another embodiment of the invention configured to additionally store zero or more presence bits, where each presence bit stored at a snoop filter storage location indicates whether a cache line identified by a tag associated with the snoop filter storage location is present in the one cache element to which the snoop filter storage location is mapped.

Each snoop filter storage location is according to yet another embodiment of the invention configured to store up to one presence bit, where a presence bit stored at a snoop filter storage location indicates whether a cache line identified by a tag stored at the snoop filter storage location is present in the cache element to which the snoop filter storage location is mapped.

Each snoop filter storage location is according to yet another embodiment of the invention sectored into a plurality of snoop filter sectors. Each snoop filter sector may be configured to store a tag that identifies a cache line storable in a cache agent. Each snoop filter sector may be configured to additionally store up to one presence bit, where a presence bit stored in a snoop filter sector of a snoop filter storage location indicates whether a cache line identified by a tag stored in the snoop filter sector is present in the cache element to which the snoop filter storage location is mapped.

The snoop filter sectors of a snoop filter storage location may according to yet another embodiment of the invention comprise a first snoop filter sector that is configured to store one tag or a fraction of one tag, and one presence bit, and one or more consecutive snoop filter sectors, each configured to store zero tags and one presence bit, where a presence bit stored in the first snoop filter sector and a presence bit in each one of the consecutive snoop filter sectors indicate the presence of separate cache lines in the same cache element. A presence bit stored in the first snoop filter sector may indicate whether a cache line identified by a tag stored in the first snoop filter sector is present in the cache element to which the snoop filter storage location is mapped, and a presence bit stored in each consecutive snoop filter sector to the first snoop filter sector may indicate whether a cache line identified by a respective consecutive tag to the tag stored in the first snoop filter sector of the snoop filter storage location is present in the cache element to which the snoop filter storage location is mapped.

According to yet another embodiment of the invention a presence bit stored in the first snoop filter sector indicates whether a cache line identified by a reconstructed tag is present in the cache element to which the snoop filter storage location is mapped, and a presence bit stored in each consecutive snoop filter sector to the first snoop filter sector indicates whether a cache line identified by a respective consecutive tag to the reconstructed tag is present in the cache element to which the snoop filter storage location is mapped, the reconstructed tag being reconstructed from a fraction of a tag stored in the first snoop filter sector, and from the number of sectors in the snoop filter storage location. The most significant bits of the reconstructed tag may consist of the fractional tag, and the least significant bits of the reconstructed tag may consist of a $\log^2(n)$ number of zeros, n being the number of sectors in the snoop filter storage location.

Other advantageous features will be apparent from the accompanying claims.

BRIEF DESCRIPTION OF THE DRAWINGS

In order to make the invention more readily understandable, the discussion that follows will refer to the accompanying drawings, in which.

DETAILED DESCRIPTION OF THE INVENTION

In the following, general embodiments as well as particular exemplary embodiments of the invention will be described. References and possible numerals will be made to the accompanying drawings. It shall be noted, however, that the drawings are exemplary embodiments only, and that other features and embodiments may well be within the scope of the invention as described.

Figure 1:
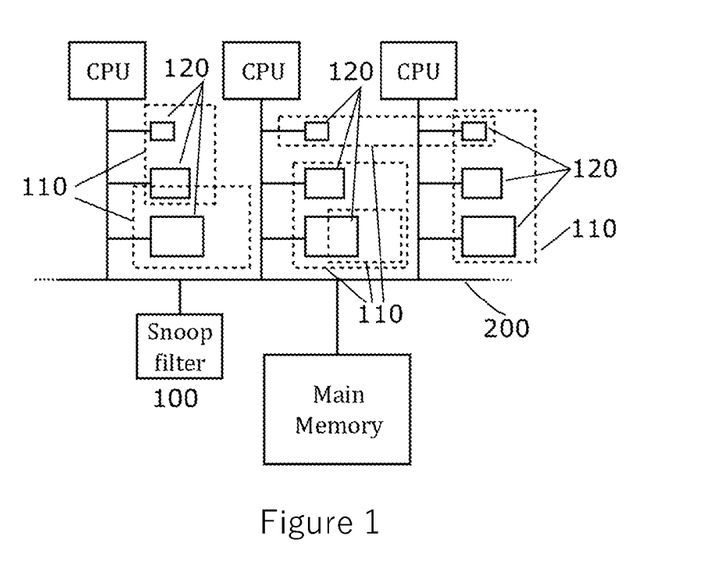
FIG. 1 is a schematic illustration of a multiprocessor computer system comprising a snoop filter device.
Figure 2:
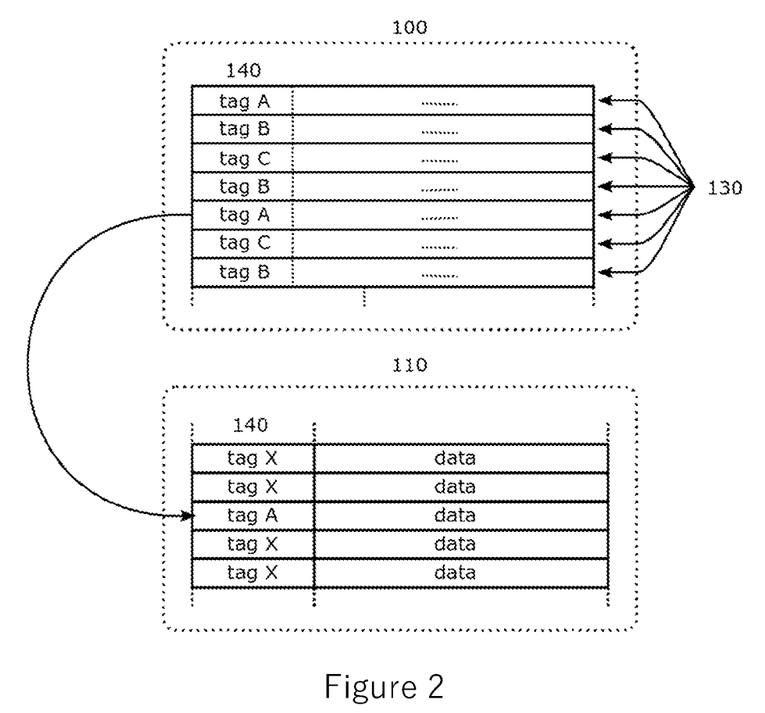
FIG. 2 is a schematic illustration of a snoop filter device comprising a plurality of snoop filter storage locations, where each snoop filter storage location indicates the presence of a cache line in a cache element.

The present invention relates to a snoop filter device for use in maintaining cache coherence across a multi-processor computer system. FIG. 1 is a schematic illustration of an example of a multiprocessor system that comprises a snoop filter device 100. Here, the snoop filter device 100 is located between a shared memory, cache agent 120/cache element 110 and processors in a multi-processor system and is connected to these components via one or more busses 200. A snoop filter device 100 can generally be considered as a directory-based device that monitors and filters bus traffic in order to reduce unnecessary snoops in the system. A snoop filter device 100 comprises as schematically illustrated in FIG. 2 a plurality of snoop filter storage locations 130 making up a directory. Each snoop filter storage location 130 is configured to store at least one tag 140, where each tag identifies a cache line stored in a cache agent 120 in the multiprocessor system. The snoop filter device 100 may thus be considered as maintaining an overview of which cache lines that are stored where in a computer system.

The present invention relates to a snoop filter device that is connectable to a plurality of cache elements, where each cache element comprises a number of cache agents. A cache element may in the context of the present invention be interpreted as an arbitrary collection of cache agents. A cache element may e.g. be interpreted as comprising any number of cache agents, e.g. an integer number of cache agents, or a fractional number of cache agents. An example of a cache element may thus be half a cache agent, one cache agent, two cache agents, one whole cache agent plus half of another cache agent etc. Cache agents in each cache element may be connected directly, collectively or a combination of directly and collectively to the snoop filter device. It will be appreciated by a person skilled in the art that any cache element may be considered as any physical cache unit, fraction of a physical cache unit or group of cache units that is uniquely identified by one cache identifier.

A cache agent may in the context of the present invention be considered as any physical cache memory hardware unit. Such a hardware unit may for example be a random-access memory such as a static random-access memory, dynamic random-access memory, or embedded dynamic random-access memory etc.

The snoop filter device comprises according to the invention a plurality of snoop filter storage locations, where each snoop filter storage location is configured to at least store a tag that identifies a cache line storable in a cache agent. Any storage location of the snoop filter device may thus during operation of the snoop filter device store a tag that identifies a cache line stored in a cache agent that belongs to a certain cache element connected to the snoop filter device. The information stored at a snoop filter storage location is often referred to as an entry, and a snoop filter storage location may therefore be interpreted as configured to store an entry. An entry may consequently in the context of the present invention generally be considered as information stored in a snoop filter storage location. An entry may thus be considered to comprise a tag, while a tag may alternatively be considered as an entry. Each snoop filter storage location may in addition to a tag store other data, such as state bits, last recently used bits, etc. These other data may be considered as a part of an entry.

FIG. 2 illustrates a snoop filter device 100 that stores a tag 140 in one of its storage locations 130, where the tag 140 identifies a cache line stored in a cache agent in a cache element 110. The cache agent may here be considered as included in the cache element 110 connected to the snoop filter device. A cache line stored in a cache element may according to the invention be considered as stored in any cache agent in that particular cache element.

The snoop filter device may in the context of the invention be considered as configured to track at least a plurality of cache lines, and a plurality of cache elements connected to the snoop filter device. Tracking a cache line by a snoop filter device here means that the snoop filter device maintains information related to which cache elements that hold a copy of the cache line. Tracking a cache element by a snoop filter device here means that the snoop filter device maintains information related to which cache lines that are stored in cache agents belonging to that cache element.

A snoop filter storage location may be considered as configured to track a cache element, and a cache line. This means that the snoop filter storage location maintains information related to whether the cache element that it is tracking holds a copy of the cache line that it is tracking. Which cache line/lines that a snoop filter storage location is/are configured to track may be given by which tag/tags that are stored in the snoop filter storage location.

Figure 3:
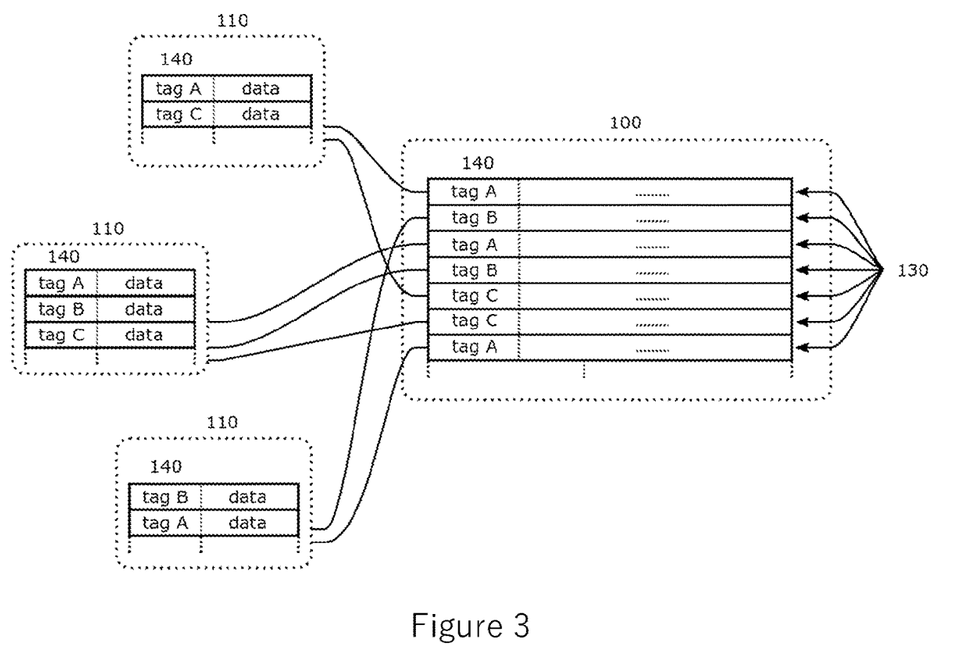
FIG. 3 is a schematic illustration of a snoop filter device comprising a plurality of snoop filter storage locations, where each snoop filter storage location is mapped to one cache element.

FIG. 3 illustrates a snoop filter device 100 according to the present invention, where each snoop filter storage location 130 is mapped to one cache element 110. This means that any one snoop filter storage location 130 may only track the cache element 110 to which it is mapped. Any one snoop filter storage location 130 may in other words only contain information that relates to cache lines that are stored in the cache element 110 to which that snoop filter storage location 130 is mapped. Each snoop filter storage location 130 may thus be said to be bijectively mapped to one cache element 110. A snoop filter storage location 130 storing a given tag 140 may consequently indicate that the cache element 110 to which that snoop filter storage location 130 is mapped holds a copy of the cache line identified by that tag 140. The same snoop filter storage location 130 may consequently not contain any information regarding which part of the cache element, e.g. which cache agent, that holds a copy of the cache line. The same snoop filter storage location 130 may not contain information regarding the presence of the cache line in other cache elements in the system. Each snoop filter storage location of the snoop filter device may according to any embodiment of the invention be considered as being configured to be mapped to one cache element. FIG. 3 illustrates a snoop filter device where multiple snoop filter storage locations are mapped to the same cache element 110. This means that the snoop filter device 100 may employ multiple snoop filter storage locations 130 in order to track multiple cache lines in one cache element 110.

In operation, a snoop filter device is connected to a plurality of cache elements, where each cache element comprises a number of cache agents as previously described. When a cache line is loaded into one of the cache elements, e.g. from main memory, the snoop filter device updates its directory by storing the tag related to the newly loaded cache line in one of its storage locations. In the event where all the snoop filter storage locations mapped to the cache element that loaded the cache line already stores an entry, the snoop filter device will have to evict an entry from a snoop filter storage location before it can store a new entry comprising the tag related to the newly loaded cache line. Which snoop filter storage location to evict from will according to the present invention depend on which cache element that loaded the cache line from main memory. According to the invention, the snoop filter device may only store the tag of the newly loaded cache line in a snoop filter storage location that is mapped to the cache element that loaded the new cache line. In other words, when a snoop filter evicts an old entry in favour of a new entry, it can only choose to evict an entry stored in a snoop filter storage location that is mapped to the cache element where the cache line identified by the tag in the new entry was loaded.

Figure 4:
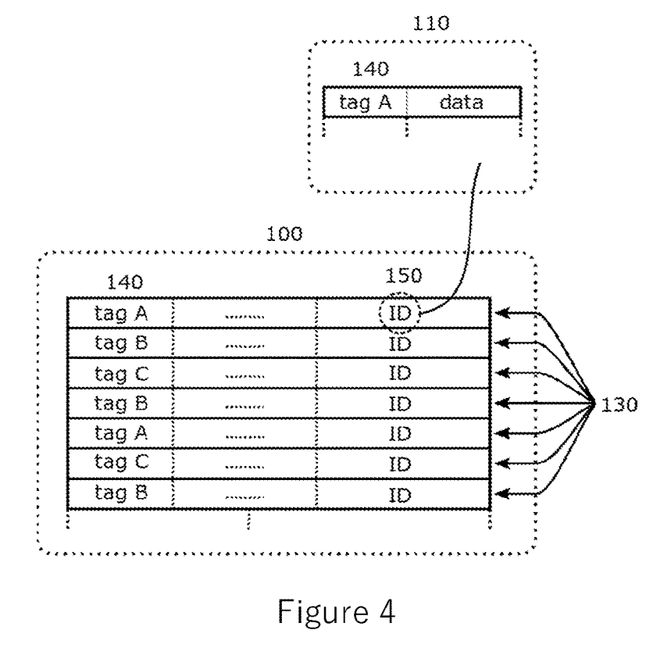
FIG. 4 is a schematic illustration of a snoop filter device comprising a plurality of snoop filter storage locations, where each snoop filter storage location stores an identifier for a cache element.
Figure 5:
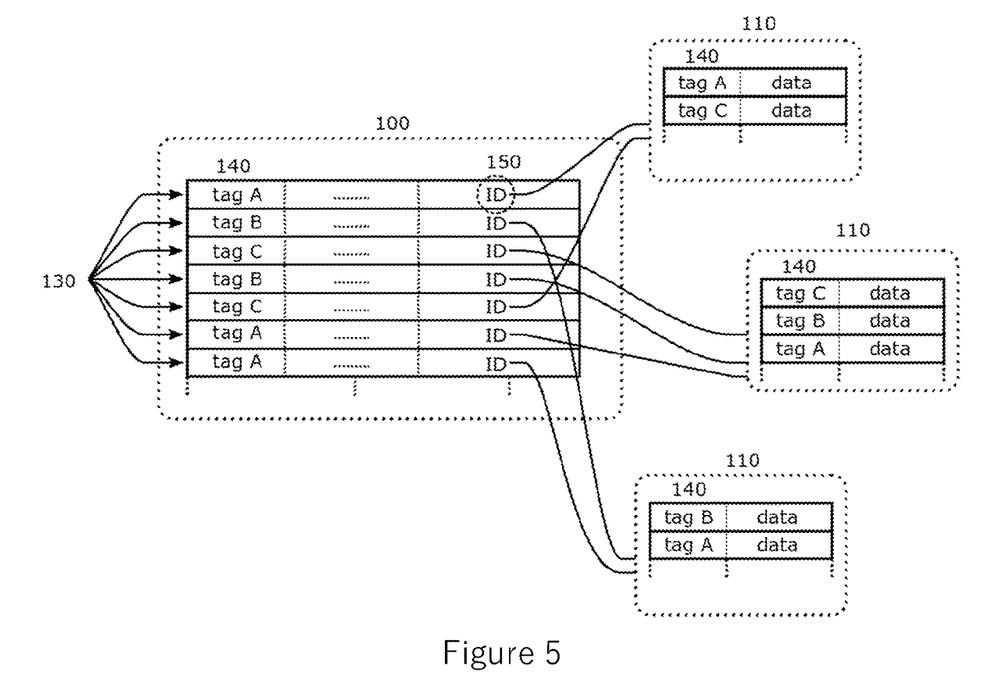
FIG. 5 is a schematic illustration of a snoop filter device comprising a plurality of snoop filter storage locations, where each snoop filter storage location stores an identifier for a cache element.

Each snoop filter storage location 130 is as previously described mapped to one cache element 110. Which cache element 110 that a snoop filter storage location 130 is mapped to may in one embodiment of the invention be determined by an identifier 150 explicitly stored in the snoop filter storage location 130. FIGS. 4 and 5 are schematic illustrations of a directory in a snoop filter device 100 where each snoop filter storage location 130 stores an identifier 150 for a cache element 110 in addition to a tag 140. An identifier 150 stored in a snoop filter storage location 130 may generally be considered as being fixed throughout an operation of the snoop filter device 100, e.g. throughout the execution of one program, and may for example only be allowed to be changed on a reboot of a program or by executing a certain reset procedure. This consequently means that the identifier 150 in each snoop filter storage location 130 may remain the same over a certain time period, e.g. determined by the time it takes to execute a certain program.

Figure 6:
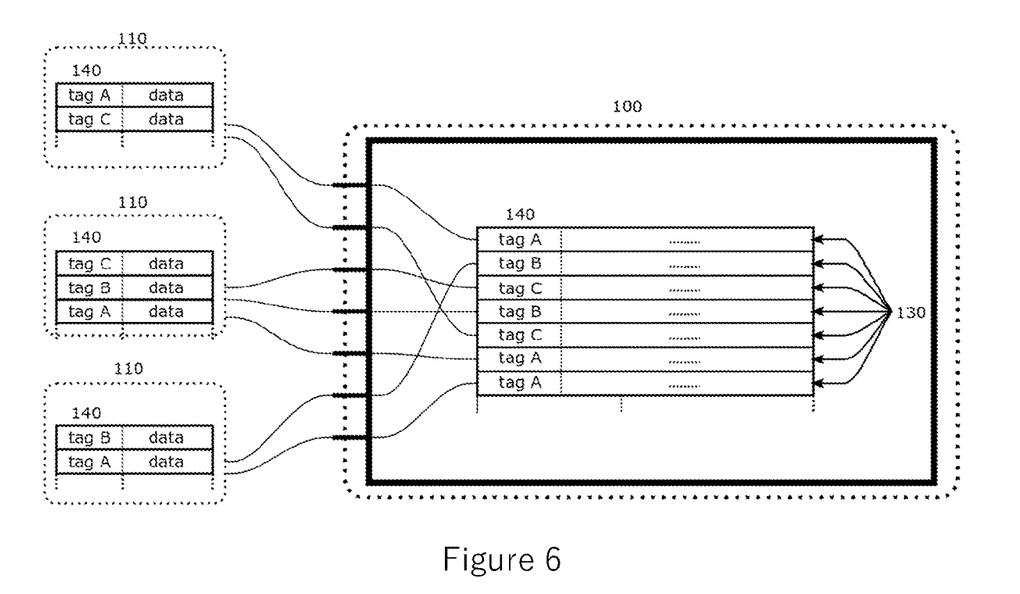
FIG. 6 is a schematic illustration of a snoop filter device comprising a plurality of snoop filter storage locations, where each snoop filter storage location is mapped to one cache element using hard wiring.

Which cache element 110 that a snoop filter storage location 130 is mapped to may in one embodiment of the present invention be determined implicitly by the snoop filter storage location 130 itself. This implicit determination is schematically illustrated in FIG. 6. Here, each snoop filter storage location 130 is implicitly related to a cache identifier 150 for a cache element 110. In this embodiment, each snoop filter storage location 130 is associated directly with one cache element 110, e.g. through its location in the snoop filter directory. The first snoop filter storage location in the directory of a snoop filter device 110 may for example be configured to be mapped to cache element A, while the second snoop filter storage location may be configured to be mapped to cache element D. This means that this first snoop filter storage location may only contain information regarding the presence of cache lines in cache element A, while the second snoop filter storage location may only contain information regarding the presence of cache lines in cache element D.

Each snoop filter storage location 130 is according to one embodiment of the invention mapped to one cache element 130 using hard wiring. In this case, each snoop filter storage location 130 is connected to one cache element 110 such that each snoop filter storage location 130 is permanently associated with the cache element 110 to which it is mapped. The mapping is in this embodiment in other words permanently set out in the device itself and cannot be changed after the device has been produced.

Figure 7:
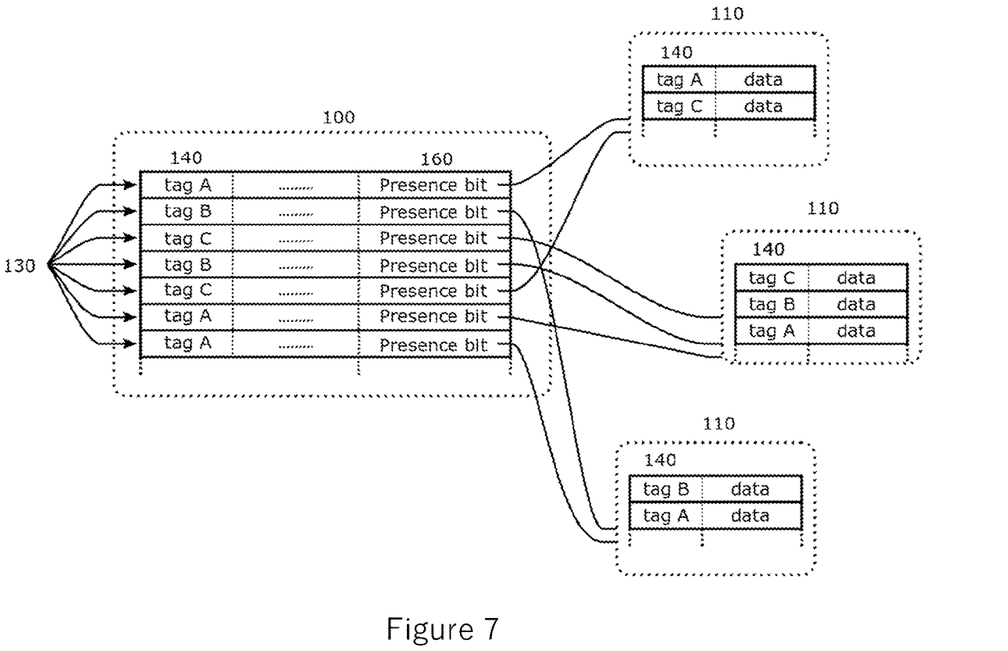
FIG. 7 is a schematic illustration of a snoop filter device comprising a plurality of snoop filter storage locations, where each snoop filter storage location stores a presence bit.

FIG. 7 is a schematic illustration of a snoop filter device 100, where each snoop filter storage location 130 is configured to store a presence bit 160 in addition to a tag 140. A presence bit 160 stored together with a tag 140 in a snoop filter storage location 130 may indicate whether a cache line identified by the tag 140 is present in the cache element 110 to which the snoop filter storage location 130 is mapped. The presence bit 160 may here be set as true if the cache line is present in the cache element 110, or false if the cache line is not present. The number of presence bits stored in a snoop filter storage location 130 may according to one embodiment of the invention be limited to maximum one.

Figure 8:
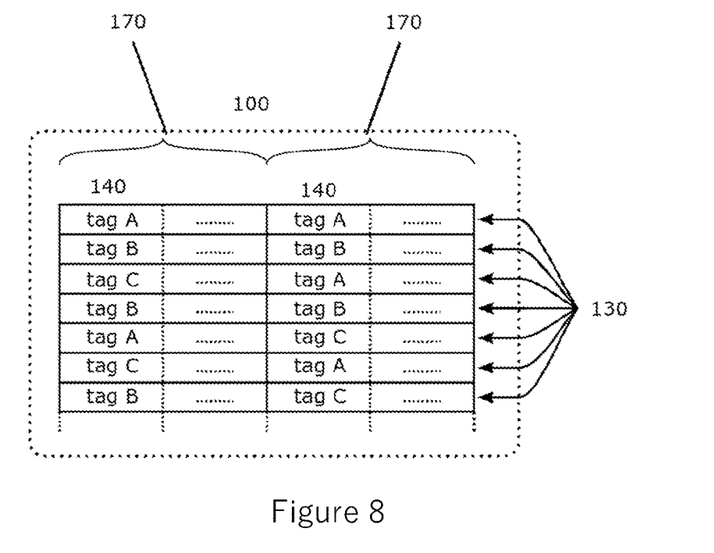
FIG. 8 is a schematic illustration of a snoop filter device comprising a plurality of snoop filter storage locations, where each snoop filter storage location is sectored into two sectors.

FIG. 8 is a schematic illustration of a snoop filter device where each snoop filter storage location 130 is sectored into a plurality of sectors 170. A sector 170 may here be considered as a part of a snoop filter storage location 130 that may store information, e.g. information relating to a given tag 140. The number of sectors 170 can in principle be any number, but is preferably a power of 2. A snoop filter storage location may comprise one sector.

Figure 9:
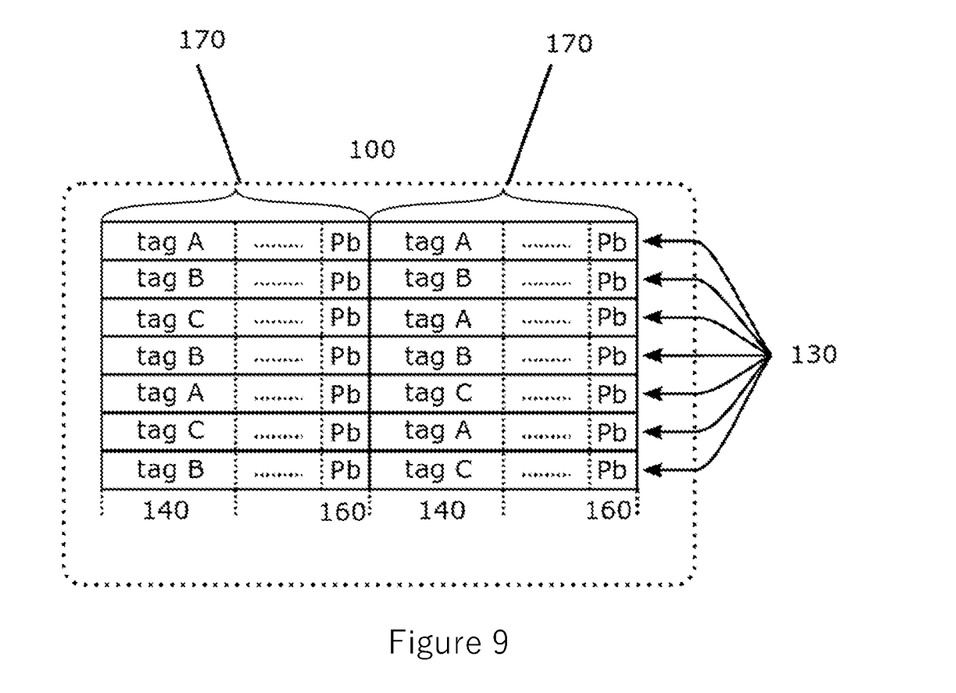
FIG. 9 is a schematic illustration of a snoop filter device comprising a plurality of snoop filter storage locations, where each snoop filter storage location is sectored into two sectors, and where each sector stores a tag and a presence bit.

In one embodiment of the invention each sector 170 of a snoop filter storage location 130 is configured to store a tag 140 that identifies a cache line storable in a cache agent. This means that one snoop filter storage location 130 may in this embodiment of the invention store as many tags 140 as it contains sectors 170. One snoop filter storage location 130 is mapped to one single cache element, meaning that each sector 170 of the snoop filter storage location 130 is mapped to the same cache element. Each snoop filter storage location 130 may in this embodiment consequently track multiple cache lines—one for each sector. FIG. 9 is a schematic illustration of a snoop filter device comprising sectored snoop filter storage locations 130, where each sector 170 is configured to store one tag 140 and one presence bit 160. A presence bit 160 stored together with a tag within a sector 170 of a snoop filter storage may here indicate whether a cache line identified by the tag 140 is present in the cache element to which the snoop filter storage location 130 is mapped. The number of presence bits 160 stored in each sector 170 may in any embodiment of the invention be limited to one.

Figure 10:
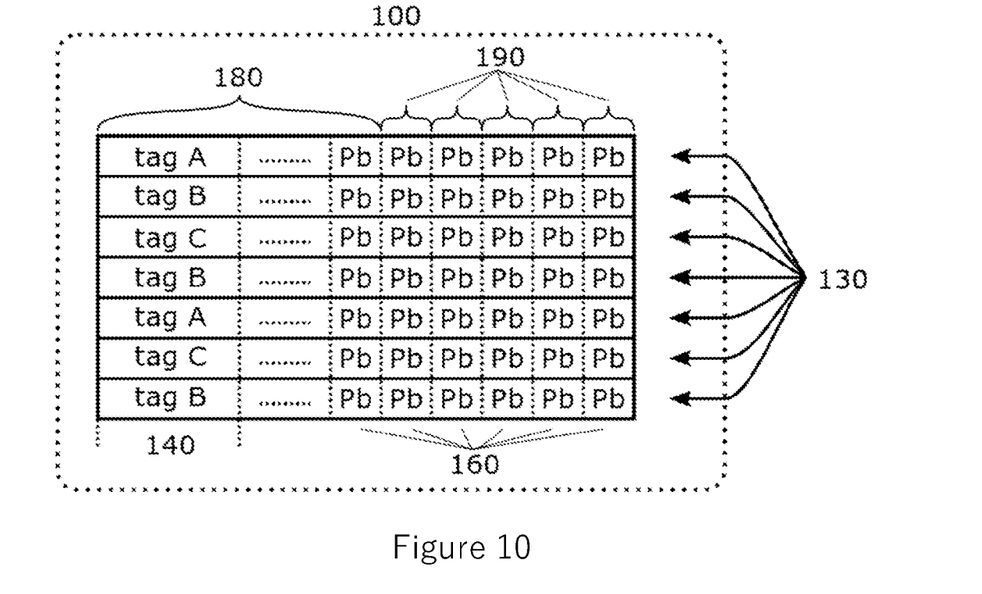
FIG. 10 is a schematic illustration of a snoop filter device comprising a plurality of snoop filter storage locations, where each snoop filter storage location is sectored into a plurality of sector, where the first sector stores a tag and presence bit, and where each consecutive sector after the first stores a presence bit.
Figure 11:
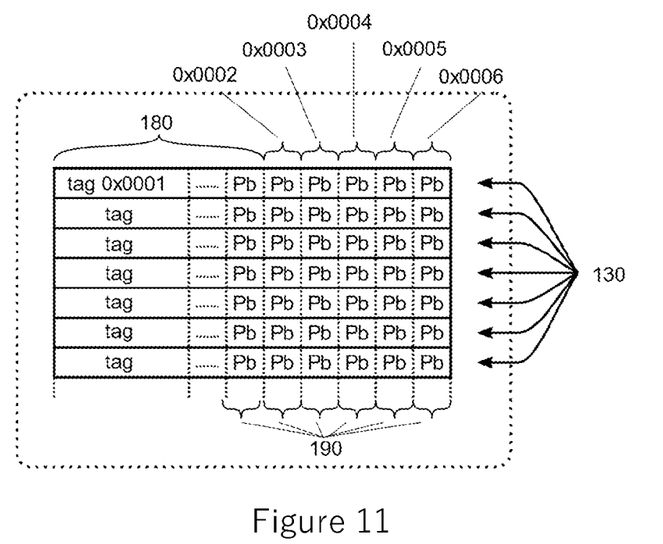
FIG. 11 is a schematic illustration of a snoop filter device comprising a plurality of snoop filter storage locations, where each snoop filter storage location is sectored into a plurality of sector, where the first sector stores a tag and a presence bit, and where each consecutive sector after the first stores a presence bit.
Figure 13:
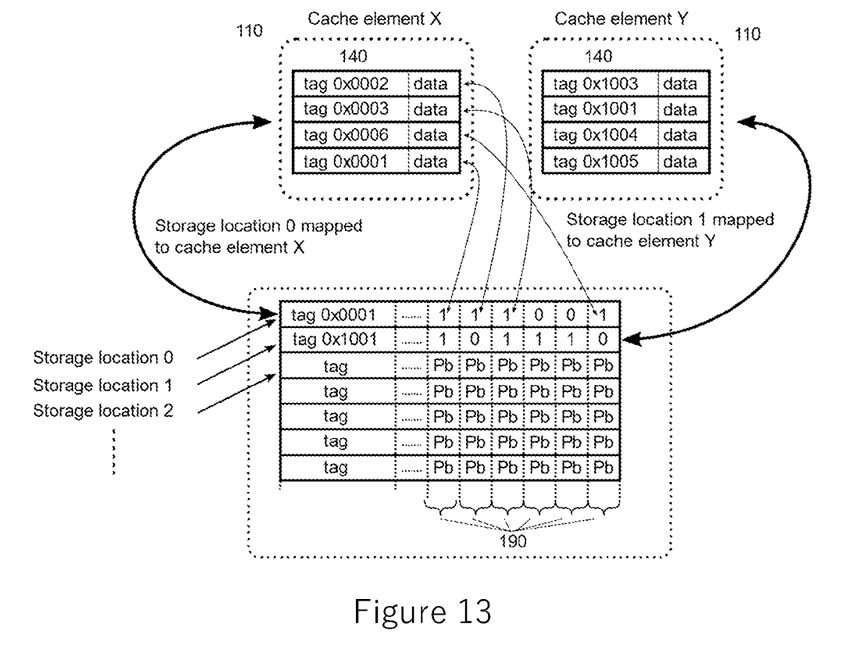
FIG. 13 is a schematic illustration of snoop filter storage locations each being mapped to one cache element, where storage location 0 is mapped to cache element X, and storage location 1 is mapped to cache element Y.
Figure 14:
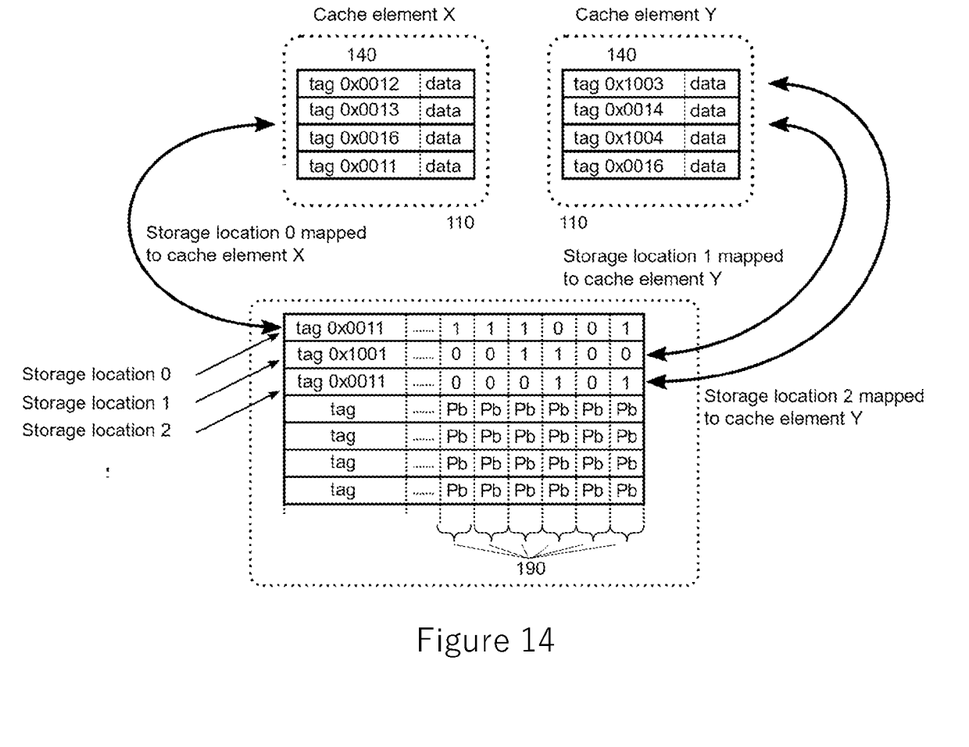
FIG. 14 is a schematic illustration of snoop filter storage locations each being mapped to one cache element, where storage location 0 is mapped to cache element X, and storage location 1 and 2 are mapped to cache element Y.

FIGS. 10, 13 and 14 illustrate an embodiment of the invention where each snoop filter storage location 130 is sectored into a plurality of sectors. Here, the first sector 180 of each snoop filter storage location 130 is configured to store one tag 140 and one presence bit 160, while each consecutive sector 190 after the first 180 is configured to store one presence bit 160, but no tag. A presence bit 160 stored together with a tag 140 in a first sector 180 in a snoop filter storage location 130 may in this embodiment of the invention indicate whether a cache line identified by the tag 140 is present in the cache element to which the snoop filter storage location 130 is mapped. The presence bit 160 of each consecutive sector 190 after the first 180 may in this embodiment of the invention indicate the presence of cache lines identified by tags with a certain iterative relationship to the tag 140 stored in the first sector 180. If the tag 140 in the first sector 180 is 0x0001, the presence bit 160 stored with this tag 140 in a first sector 180 in a snoop filter storage location 130 may indicate the presence of a cache line identified by the tag 0x0001 in the cache element to which the snoop filter storage location 130 is mapped. The presence bits 160 of the consecutive second, third, and fourth sector 190 after the first 180 may here for example indicate the presence of cache lines identified by the tags 0x0002, 0x0003 and 0x0004 in the cache element to which the snoop filter storage location 130 is mapped. The tags 0x0002, 0x0003 and 0x0004 are in FIG. 10 given implicitly through their relationship with the first tag, meaning that neither one of the tags 0x0002, 0x0003 and 0x0004 are stored in any sector but are implicitly given by the tag 140 in the first sector 180 and the number of the consecutive sector. The relationship between the explicitly given tag in the first sector and the implicitly given tags in the consecutive sectors may in principle take any form. Following the example with a tag in the first sector being 0x0001, the implicitly given tags of each consecutive sector may e.g. follow a formula such that the tag in sector m is given by a function of m. The tag in a sector m may for example equals the tag in the first sector multiplied by a function of m, e.g. m, 2 m, $m^2$, etc. FIG. 14 illustrates an example where separate storage locations, each mapped to different cache elements, may store the same tag.

Figure 12:
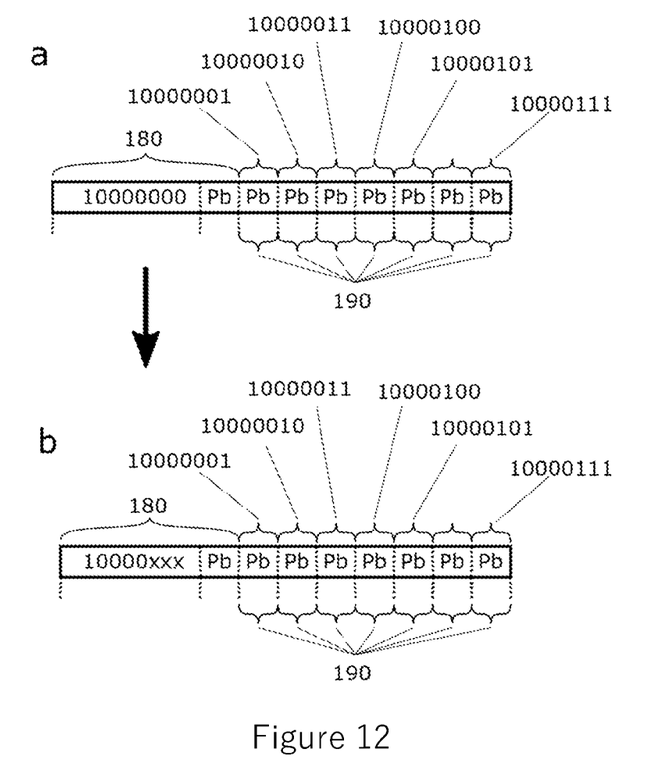
FIG. 12a is a schematic illustration of a snoop filter storage location sectored into a plurality of sectors, where the first sector stores a tag and a presence bit, and where each consecutive sector after the first stores a presence bit.
FIG. 12b is a schematic illustration of a snoop filter storage location sectored into a plurality of sectors, where the first sector stores a fraction of a tag and a presence bit, and where each consecutive sector after the first stores a presence bit.

The first sector 180 of each snoop filter storage location may according to one embodiment of the invention be configured to store a fraction of a tag, and one presence bit. A fraction of a tag/fractional tag may here be interpreted as a subset of the Y number of bits required to write out a full tag. Sectoring of a snoop filter storage location into multiple sectors allows for the tag in the first sector 180 to be identified using X fewer bits than the Y number of bits required to write out the full tag. Here, $X=\log^2(n)$, where n equals the number of sectors in the snoop filter storage location. FIG. 12a illustrates a snoop filter storage location where a full 8 bit tag, 10000000, is stored in the first sector 180, and where each consecutive sector 190 is associated with the consecutive tags 10000001 to 10000111. The linear consecutive relationship between the first tag and the consecutive tags allows the tag in the first sector 180 to be shortened by its 3 least significant bits. These bits are then implicitly given by the number of sectors. FIG. 12b illustrates a snoop filter storage location where a Y=8 bit tag 10000000 is stored in the first sector 180 of a snoop filter storage location as 10000. The $X=\log^2(\# \text{ of sectors})=\log^2(8)=3$ least significant bits of the 8 bit tag is not explicitly stored in the first sector 180 as these can be implicitly deduced from the fact that there are 8 sectors in the snoop filter storage location. The full Y bit tag can here be reconstructed by adding the fraction of a tag/fractional tag stored in the first sector 180 and a $\log^2(n)$ number of zeros. The full Y bit tag may in other words be reconstructed such that the fractional tag makes up the most significant bits while the $\log^2(n)$ number of zeros make up the least significant bits. A snoop filter storage location may consequently be considered as storing a full Y bit reconstructed tag, where the full Y bit reconstructed tag is given partly by the explicitly stored fractional tag, and partly implicit by the number of sectors in the snoop filter storage location. The full Y bit reconstructed tag can in other words be considered as being stored in the snoop filter storage location.

Sectoring of snoop filter storage locations may consequently be used in order to optimize the number of cache lines that can be tracked per storage in the snoop filter. This can be seen directly from FIG. 12a and FIG. 12b. The 16 bits required to write out the information in the storage location illustrated in FIG. 12a may be reduced by 3 bits by replacing the tag with a fractional tag. The full tag may here be reconstructed from merging the fractional tag 10000 with $\log^2(\text{number of sectors})$, i.e. 10000 merged with 000=10000000.

The relationship between the explicitly given tag 140 in the first sector 180 and the implicitly given tags in the consecutive sectors 190 may be programmed or alternatively be hard wired.

100 Snoop filter device
110 Cache element
120 Cache agent
130 Snoop filter storage location
140 Tag
150 Cache element identifier
160 Presence bit
170 Snoop filter sector
180 First snoop filter sector
190 Consecutive snoop filter sector

The invention claimed is:

1. A snoop filter device connectable with a plurality of cache elements, where each cache element includes a number of cache agents, the snoop filter device comprising:
 a plurality of snoop filter storage locations, each configured to store a tag that identifies a cache line storable in a cache agent;
 wherein each snoop filter storage location is mapped to one cache element, such that any one snoop filter storage location only contains information that relate to cache lines that are stored in the cache element to which that snoop filter storage location is mapped; and
 wherein each snoop filter storage location is sectored into a plurality of snoop filter sectors; and
 wherein the snoop filter sectors of a snoop filter storage location include:
  a first snoop filter sector that is configured to store one tag or a fraction of one tag, and one presence bit; and
  one or more consecutive snoop filter sectors, each configured to store zero tags and one presence bit;
  wherein a presence bit stored in the first snoop filter sector and a presence bit in each one of the consecutive snoop filter sectors indicate the presence of separate cache lines in the same cache element.

2. The snoop filter device according to claim 1, wherein each snoop filter storage location is configured to additionally store an identifier for a cache element.

3. The snoop filter device according to claim 2, wherein each snoop filter storage location is mapped to one cache element identified by the identifier stored at that snoop filter storage location.

4. The snoop filter device according to claim 1, wherein each snoop filter storage location is implicitly associated with one cache element.

5. The snoop filter device according to claim 4, wherein each snoop filter storage location is mapped to one cache element using hard wiring.

6. The snoop filter device according to claim 1, wherein:
 each snoop filter storage location is configured to additionally store zero or more presence bits; and
 each presence bit stored at a snoop filter storage location indicates whether a cache line identified by a tag associated with the snoop filter storage location is present in the one cache element to which the snoop filter storage location is mapped.

7. The snoop filter device according to claim 6, wherein:
 each snoop filter storage location is configured to store up to one presence bit; and
 a presence bit stored at a snoop filter storage location indicates whether a cache line identified by a tag stored at the snoop filter storage location is present in the cache element to which the snoop filter storage location is mapped.

8. The snoop filter device according to claim 1, wherein each snoop filter sector is configured to store a tag that identifies a cache line storable in a cache agent.

9. The snoop filter device according to claim 8, wherein each snoop filter sector is configured to additionally store up to one presence bit, and wherein a presence bit stored in a snoop filter sector of a snoop filter storage location indicates whether a cache line identified by a tag stored in the snoop filter sector is present in the cache element to which the snoop filter storage location is mapped.

10. The snoop filter device according to claim 1, wherein:
 a presence bit stored in the first snoop filter sector indicates whether a cache line identified by a tag stored in the first snoop filter sector is present in the cache element to which the snoop filter storage location is mapped; and
 a presence bit stored in each consecutive snoop filter sector to the first snoop filter sector indicates whether a cache line identified by a respective consecutive tag to the tag stored in the first snoop filter sector of the snoop filter storage location is present in the cache element to which the snoop filter storage location is mapped.

11. The snoop filter device according to claim 1, wherein
 a presence bit stored in the first snoop filter sector indicates whether a cache line identified by a reconstructed tag is present in the cache element to which the snoop filter storage location is mapped; and
 a presence bit stored in each consecutive snoop filter sector to the first snoop filter sector indicates whether a cache line identified by a respective consecutive tag to the reconstructed tag is present in the cache element to which the snoop filter storage location is mapped;
 the reconstructed tag being reconstructed from a fraction of a tag stored in the first snoop filter sector, and from the number of sectors in the snoop filter storage location.

12. The snoop filter device according to claim 11, wherein:
 the most significant bits of the reconstructed tag consist of the fractional tag; and
 the least significant bits of the reconstructed tag consist of a $\log^2(n)$ number of zeros, n being the number of sectors in the snoop filter storage location.

* * * * *